G. W. N. YOST.
Steam Plow.
No. 20,122.
Patented Apr. 27, 1858.
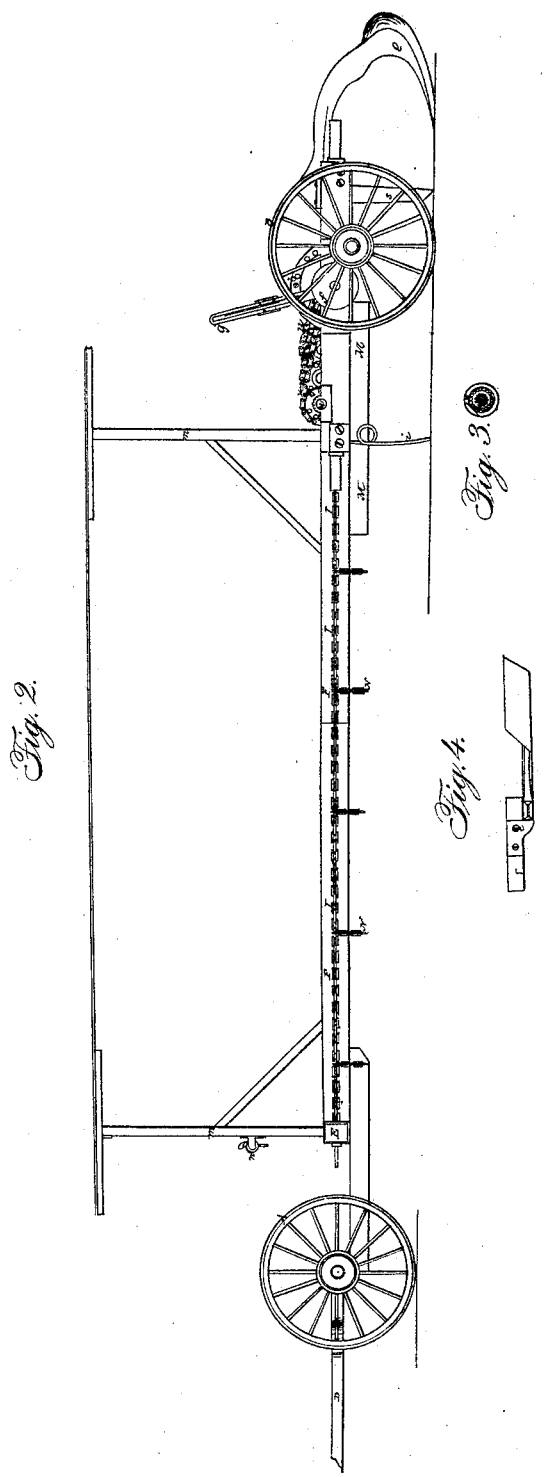
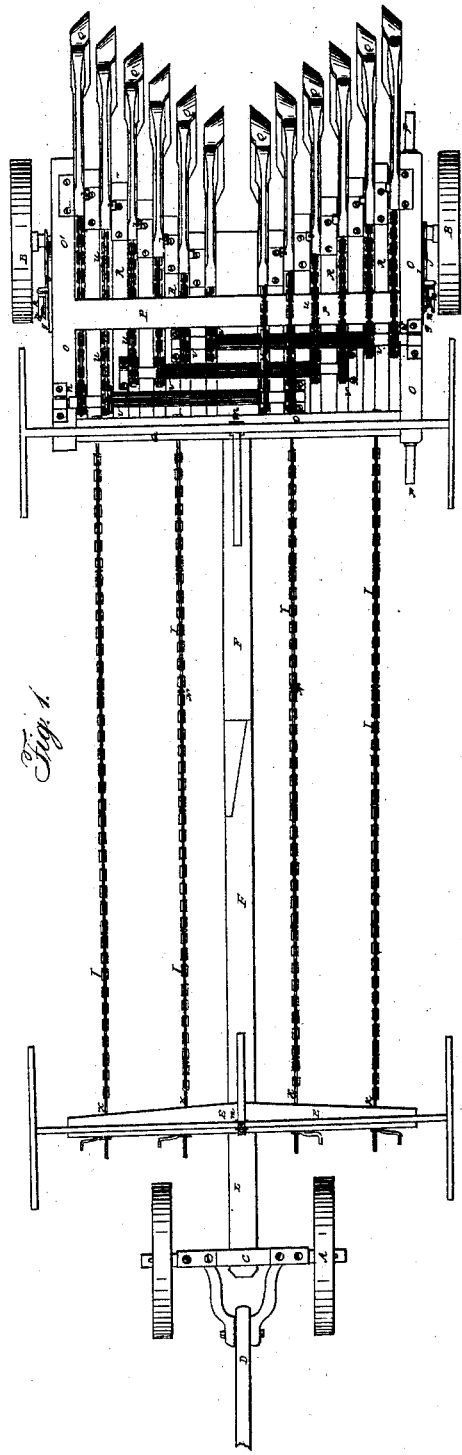

UNITED STATES PATENT OFFICE.

G. W. N. YOST, OF CINCINNATI, OHIO.

IMPROVEMENT IN GANG-PLOWS.

Specification forming part of Letters Patent No. 20,122, dated April 27, 1858.

*To all whom it may concern:*

Be it known that I, G. W. N. YOST, of Cincinnati, in the county of Hamilton and State of Ohio, have invented a new and Improved Plowing-Machine; and I do hereby declare that the following is a full and exact description thereof, reference being had to the accompanying drawings, and to the letters of reference marked thereon.

The difficulty of obtaining a sufficient number of workmen, as well as the expense thereon attendant, to plow the land in season for sowing has directed the earnest attention of American agriculturists to the necessity of a new labor-saving plowing-machine, which should at the same time economize both time and money. To this end various gang and steam plows have been tried, but all hitherto without answering the end in view. The necessity of employing many teamsters in the gang-plow has not been obviated; neither has any sufficient means been found of remedying the difficulty of passing stones and other obstacles, which are liable to break the plow or to throw the whole gang from the ground. If horses are used in these plows their keeping throughout the year is very expensive, while the plowing season is very short. Steam-power has also been found too expensive to be profitably employed. These difficulties are effectually obviated by my invention, as by it but two men are required to manage twenty yokes of oxen, and these can plow twenty acres per day, which, in the old way of plowing, would require twenty men. Nor is it necessary that the oxen should be previously trained. As large herds of cattle are raised for beef alone, and as these animals, without previous training, can be put to work in this machine, the expense of such power will be very little.

My invention consists of a plowing-machine provided with spring-shares, a team-guide, and a team-shade, so that two men may manage twenty or more yokes of untrained oxen, and plow over stumps, stones, or other obstacles without breaking the plow or stopping the team.

In the accompanying drawings, Figure 1 represents a top view of my plowing-machine. Fig. 2 represents a side elevation of the same. Figs. 3 and 4 are detached parts.

The whole machine is supported by four wheels, A A and B B. One of the hind wheels usually runs upon the ground already plowed. Therefore the tread of these wheels should be broad, in order to lessen the draft of the machine. The forward axle may be made short enough to allow both of the wheels A A to run upon the ground not yet plowed. The machine turns like a common wagon. The forward wheels have a shaft or spire, D, for the attachment of a yoke of lead oxen or of a span of horses.

Between the forward axle, C, and the main frame of the machine is a long, stiff bar, F, which, in connection with the forward wheel, serves to guide the main team to be attached to the chains I I. This bar F or team-guide is provided with a cross-bar, E, and is connected with the forward wheels by a coupling-bar, L. It is loosely inserted into bars E and G by tenons, and is then held firmly in place by the chains I I, which may be tightened by means of screw-hooks K K. The coupling-bar L and the bar M contribute to strengthen the joints at the ends of this bar F.

Each of the branch chains N N is intended for the attachment of a yoke of oxen by hooking into the ring or staple of the yoke in the usual manner.

In order to hook up or attach the team, it may be necessary to make free one end of the main chains I I until five yokes of oxen are arranged in line upon said chain, when the latter is hooked on and then tightened by the screw-hooks K. When the four gangs of oxen are arranged upon the four chains I I no single yoke can move far without being accompanied by the whole team, yet the branch chains N N allow each pair of oxen sufficient freedom to work with ease. By this arrangement two drivers may easily manage the whole team of twenty or more yokes of oxen. One driver attends the lead yoke of oxen attached to the forward wheels, on which he may ride. The other driver is mounted upon the frame of the machine, behind all the oxen. The lead yoke have only to turn the forward wheels to the right or left, when the whole team in moving forward is swayed in the same direction. It is not drawn to the right or left by the leaders, but is made to follow the forward wheels by the mere forward draft of the whole twenty yokes. Therefore, this immense team is directed with perfect ease, even though not a single yoke of the oxen, except the leaders, could be driven separately.

The frame consists of two side pieces, O O', and two cross-bars, G and P. Connected with bar P is a series of bars, R R, for supporting the plows.

The colter S, Fig. 2, and the body of the plow Q are cast in one piece, and are supported by means of a pivot, t.

In the accompanying drawings, the share and mold-board of the plow are not shown. The point of the share is intended to come forward nearly to the colter S, Fig. 2.

Each plow swings freely backward and forward upon the pivot t, and yet it is not allowed any lateral motion. These plows are held in place by springs of peculiar construction, with which they are connected by chains u u. These springs consist of a series of steel rods, x x, the ends of which are firmly attached to pulleys v v and supported by a rod, w. One of these springs may be packed within another, as shown in section in Fig. 3, two springs being set upon a single rod. One end of each chain u u is attached to one of the plows below the pivot t, while the other end passes around one of the pulleys v v, with which it is connected. Each spring has a pulley upon both ends; but the chains pass around the pulleys in opposite directions on the two ends of the same spring. By this arrangement the plows are connected in pairs with opposite ends of torsion-springs. One of the pulleys upon each spring is made double, as seen in Fig. 3, and is provided with a ratchet and pawl, in order to give any desired degree of tension to the springs. The spring must be twisted until its force is sufficient to hold the plows in place for turning the furrow; but if the colter or share strikes a stone, stump, or other obstacle the spring yields before breaking the plow and allows the latter to swing backward and ride over the obstacle, after which the spring brings the plow again to its working position. A stop, c, shown in Fig. 4, prevents each plow from being drawn too far forward. With these springs each plow works independently and automatically, passing obstacles two or more feet high without any occasion to stop the team or any danger of breaking the plows.

The number of plows may be more or less, but I recommend the use of twelve, the six on the right turning the furrows in a direction opposite to those on the left.

The main frame of the machine rests upon two eccentrics, f f, attached to the journals of the hind wheels. By placing the hand upon lever g these eccentrics are worked so as to elevate or depress the frame at pleasure, and thus regulate the depth to which the plows work or throw the whole gang completely out of the ground. A pin upon the lower end of lever h plays into the holes of the semicircular rack l, and is held in place by the spring k, fixing the eccentrics at any desired point.

The shade-frame m carries a canvas to shelter the oxen from the heat of the sun or from rain. The canvas may be tightened by means of the ratchet-wheel n and a cord.

Although this machine is very large, it is readily changed into a compact form. The hind wheels are easily removed and placed upon the additional journals p p, thus converting the bar O into an axle. Then, by removing the shade-frame m and the team-guide F the front wheels may be brought around, so as to support the other ends of bars G and P. This forms a compact carriage, which may be easily transported. The team-guide is unbolted at the center and placed upon the carriage with the loose parts of the shade-frame. This change of form can be effected in a few minutes, and the whole is easily replaced again, when desired.

My invention meets one of the greatest wants of the age by furnishing a cheap and efficient power, not only for ordinary but also for subsoil plowing, for which it is especially adapted.

Although in this specification only a single machine is described, yet I contemplate the employment of the distinguishing-features of my invention, in whole or in part, in various other machines for which I am now preparing to make application for Letters Patent to protect me in the use of these features in machines for ditching, excavating, harrowing, seed-drilling, harvesting, raking, and other purposes to which the new principles of my invention are equally applicable.

The devices employed in my machine may be somewhat modified without departing from my invention, which lies chiefly in the new effects produced. The team-guide, for instance, may be made with two or more main shafts, or it may be reversed so that the yoke of guide-oxen may follow the main team.

Having thus fully described my invention, what I claim, and desire to secure by Letters Patent of the United States, is—

1. The torsion-spring above described, in combination with the plowshare, for the purpose of allowing a single share to swing backward in passing stones, and then automatically to replace itself in working position, thus avoiding the breaking of the plow or stopping of the team, substantially as set forth.

2. The use of the team-guide for managing the team, so as to obviate the necessity of employing many drivers, substantially as described.

3. The use of the team-shade, in combination with the team-guide, for sheltering the team from the heat of the sun or from rain, substantially as set forth.

G. W. N. YOST.

Witnesses:
EDM. F. BROWN,
DANIEL BREED.